Figure 1:
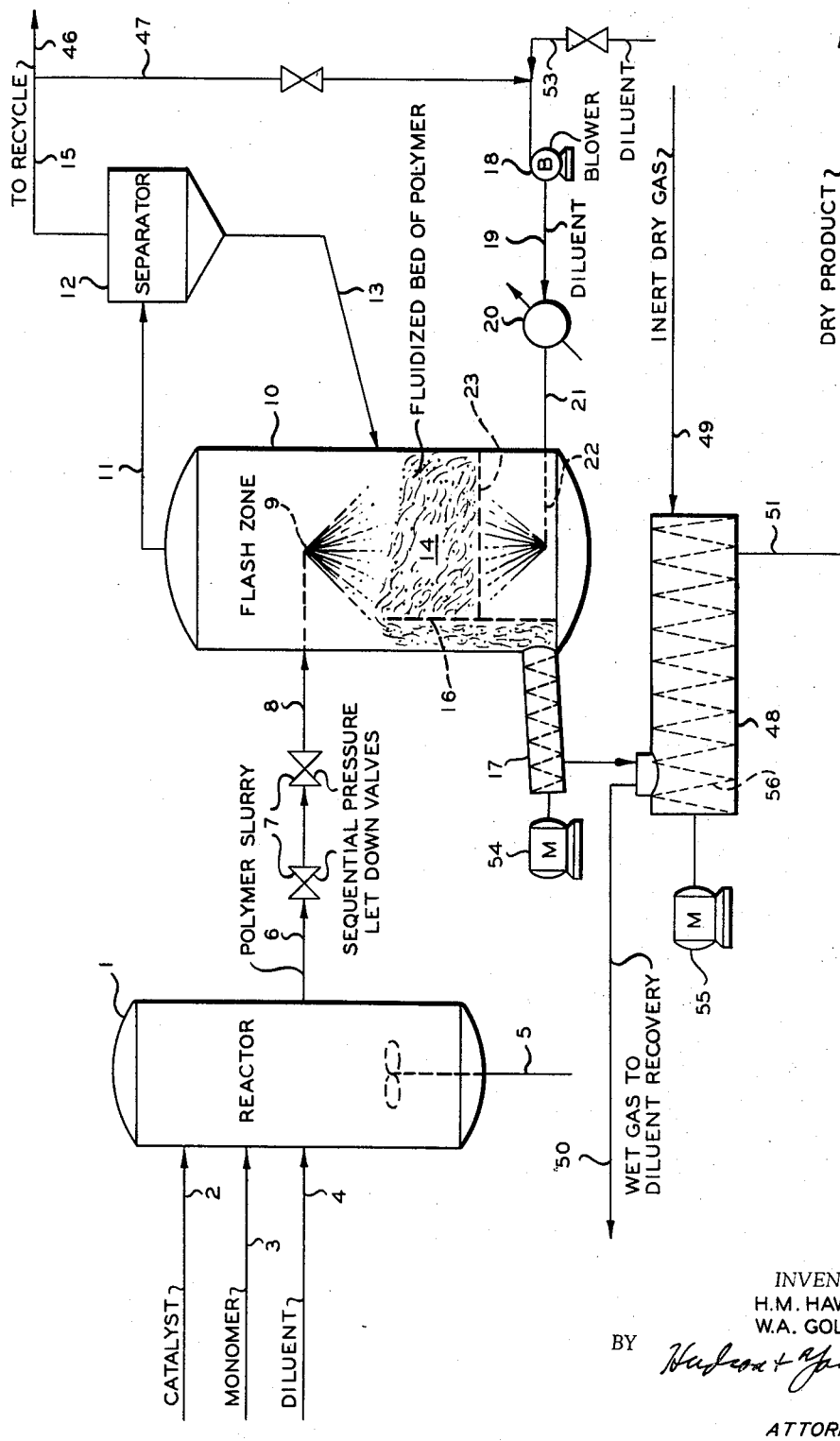

INVENTORS
H.M. HAWKINS
W.A. GOLDTRAP
BY
ATTORNEYS

2,949,447
Patented Aug. 16, 1960

2,949,447

PROCESSING OF POLYMER MADE IN SLURRY PROCESS

Harold M. Hawkins and Walter A. Goldtrap, Bartlesville, Okla., assignors to Phillips Petroleum Company, a corporation of Delaware Filed Feb. 28, 1957, Ser. No. 643,041

18 Claims. (Cl. 260—93.7)

This invention relates to solid polyolefins. In one of its aspects, this invention relates to separation of solid polymers of 1-olefins from polymerization diluent.

It has recently been discovered that 1-olefins having a maximum of 8 carbon atoms per molecule and no branching nearer the double bond than the 4-position can be polymerized to solid and semi-solid polymers at low temperatures and pressures as compared with conventional processes for polymerizing these olefins. Such polymerization is generally carried out by first admixing and at least partially dissolving the olefins in a non-polymerizable solvent and carrying out the polymerization in the presence of a catalyst.

In the copending application of J. P. Hogan and R. L. Banks, Serial No. 573,877, filed March 26, 1956, now Patent 2,825,721, a process is described for producing novel polymers of 1-olefins by carrying out the polymerization at a temperature in the range of 100 to 500° F. in the presence of 0.1 to 10 or more weight percent of chromium as the oxide, including a substantial proportion of hexavalent chromium, usually associated with at least one porous oxide selected from the group consisting of silica, alumina, zirconia, and thoria. A preferred catalyst is one comprising 0.1 to 10 weight percent chromium as the oxide on a silica-alumina support such as 90 percent silica-10 percent alumina. This catalyst is ordinarily a highly oxidized catalyst which has been activated by high-temperature treatment under non-reducing conditions and preferably with an oxidizing gas. The polymerization is suitably carried out in the liquid phase such as in solution in a hydrocarbon solvent, especially a paraffin or cycloparaffin which is liquid under the polymerization conditions. Also, diolefins can be polymerized by the chromium oxide catalyst to produce solid polymers. The copending application of G. T. Leatherman and C. V. Detter, Serial No. 590,567, filed June 11, 1956, discloses and claims an improvement in the Hogan and Banks method in that it discloses the polymerization of ethylene or copolymerization of ethylene with another 1-olefin at a temperature below the precipitation temperature of the polymer being formed and in the presence of a poor solvent for the polymer. By such operation, the polymer is formed as discrete particles of high molecular weight polymer containing the catalyst. The yield of polymer per pound of catalyst is exceedingly high with this method. In the copending application of R. A. Findlay, Serial No. 591,864, filed June 18, 1956, a method is disclosed for precipitating polymer formed by the Hogan et al. method in the solvent which comprises cooling the solution by evaporation of a portion of the solvent, e.g., auto-refrigeration.

The method of the instant invention is applicable to recovering solid polymer from hydrocarbon diluents broadly and is especially suitable for recovery of solid polymer from hydrocarbon slurries as formed by the Leatherman et al. method and the Findlay method. However, the method is also suitable for recovery of polymer from slurry no matter how prepared. The polymer prepared with chromium oxide catalyst is particularly useful in preparation of moldings, film, and many other uses where a high molecular weight, high softening point article which also has excellent low temperature properties is desired. However, solid olefin polymers prepared by other systems can also be advantageously treated by the process of this invention, for example, those polymers prepared by organometallic catalyst such as those disclosed by Karl Ziegler in Belgian Patent 533,362, November 16, 1954, now Patent No. 2,897,967.

In any case, to recover solid polymers from diluent, it has been the practice to flash part of the diluent and to centrifuge, filter, etc., to remove additional diluent after which the wet polymer had to be dried. The subsequent drying steps requires a large volume of heated gas which in turn has to be separated from diluent vapor.

It is an object of this invention to provide an improved method of recovering polymer from diluent.

It is a further object of this invention to reduce the cost of drying a solid polymer.

It is still another object of this invention to provide a continuous method of obtaining solid polymers of 1-olefins in substantially dry form by recovery of the polymer from the polymerization process.

Still other objects, features and advantages of this invention will be obvious to those skilled in the art having been given this disclosure.

According to this invention, diluent is flashed from a slurry of polymer in a hydrocarbon diluent leaving polymer in a fluid bed and a portion of the vaporized diluent is recycled to the fluid bed to maintain the polymer in fluid suspension and to further dry the polymer. The polymer is continuously removed from the bed through a solids transfer means and any remaining diluent removed by means of an inert gas.

As has been indicated, the polymeric materials to which this invention is particularly applicable are polymers of 1-olefins. These polymers can be homopolymers or copolymers and we particularly prefer those polymers prepared from 1-olefins of 2 to 8 carbon atoms per molecule comprising a major proportion of ethylene or propylene and particularly comprising at least 90 weight percent of one of those 1-olefins since such polymers when precipitated are solid non-agglutinative particles. Polymers of 1-olefins containing 2 to 8 carbon atoms and having no branching nearer the double bond than the 4-position have been found in recent years to have superior heat resistance and superior low temperature properties when polymerized at relatively low temperatures and pressures. The above-identified method of Hogan et al. is one such low temperature-low pressure method. Polymers of ethylene or propylene are particularly useful and copolymers of these materials with each other or in major proportion with other 1-olefins of the type indicated have also been found to have many commercial uses such as for ejection molding, film, and the like.

Examples of the preferred 1-olefins whose polymers can be dried by the method of this invention include ethylene, propylene, 1-butene, 1-pentene, 1-hexene, 1-octene, 4-methyl-1-pentene, 4-methyl-1-hexene, 4-ethyl-1-hexene, 6-methyl-1-heptene, 5-methyl-1-heptene and the like as well as copolymers of these 1-olefins.

The diluents especially useful in polymerization of the 1-olefins by the method of Hogan et al. are hydrocarbons and preferably paraffins including cycloparaffins. These diluents include paraffins and cycloparaffins having 3 to 12 carbon atoms per molecule. Any of the paraffins or cycloparaffins which are a solvent for the monomers at the temperature in the polymerization range are suitable. While paraffins and cycloparaffins are preferred, any hydrocarbon which is relatively inert, non-deleterious, and liquid under the operating conditions of the polymerization process can be utilized. Diluents that have been used successfully in the polymerization reaction and are operable in this invention include propane, isobutane, normal pentane, isopentane, isooctane (2,2,4-trimethylpentane), cyclohexane and methylcyclohexane. Using the organometal catalyst, it is generally preferred to use aromatic hydrocarbon diluents such as benzene and naphthalene, however, any of the hydrocarbons which are relatively inert, non-deleterious, and liquid under the operating conditions of the polymerization can be used. That is, any of the hydrocarbons as listed in the preferred groups can be used in either process while unsaturated aliphatic and cyclic hydrocarbons are, in general, not used in the polymerization zone since they are likely to enter the polymerization reaction. However, any of these hydrocarbons can be removed from polymer by the method of this invention.

In the practice of this invention the polymer is prepared either as discrete particles during polymerization or polymer is precipitated in the solvent by cooling such as by heat exchange, additional cold solvent, autocooling, e.g., evaporation, or the like. The slurry is passed to a zone of low pressure causing solvent to flash leaving polymer particles which fall to a low level in the zone forming a bed of polymer. A portion of the flashed solvent is cycled back to this zone and passes through the polymer bed fluidizing same and further drying the polymer. The polymer is withdrawn and any remaining solvent is removed by passing an inert gas therethrough.

As has been indicated, the polymer slurry is prepared by polymerizing the polymer at a temperature wherein the polymer is formed as discrete particles. Such a method is fully described and claimed by Leatherman and Detter, supra. According to that case, ethylene or mixtures of same with other unsaturated hydrocarbons are contacted with a suspension of a chromium-oxide containing catalyst in a liquid hydrocarbon selected from the group consisting of paraffinic hydrocarbons and naphthenic hydrocarbons. When the hydrocarbon is a paraffinic hydrocarbon the contacting is generally in the range of 230° F. and below and when the hydrocarbon is a naphthenic hydrocarbon the contacting is generally 190° F. or below. On the other hand, when polymerizing in solution, the polymerization temperature is maintained at a level sufficient to prevent precipitation of the polymer. For example, ethylene can be polymerized in cyclohexane in the presence of 0.25 weight percent catalyst consisting of 2.5 weight percent chromium oxide on a 90–10 silica-alumina support, 285° F. and 450 p.s.i., said catalyst having been activated at 950° F. for four hours.

In a preferred method of operation, the polymer slurry is passed through a pair of sequentially operated pressure let-down valves to the flash zone. The slurry enters the flash zone through a spray nozzle and most of the solvent is immediately flashed, however, due to the flashing of solvent, the material is cooled considerably and a portion of the solvent remains as a wet film on the polymer. The polymer falls onto a fluidized bed and a portion of the solvent is super heated and recycled to the bottom of the bed to act as the fluidizing medium and to essentially dry the polymer. The polymer is continuously removed through a standpipe as a relatively quiescent column. This polymer will be associated with solvent vapors which are removed by sweeping the vapors out by means of an inert gas such as warm air. It will be obvious to those skilled in the art that the polymer in solution can be flashed to precipitate polymer and remove solvent. However, this method is not preferred since such flashing will generally cause the polymer to precipitate as fine string and not compact grains as is generally preferred. Such strings are not readily fluidized and are more difficult to dry and handle than are the grainy polymer particles.

Figure 2:
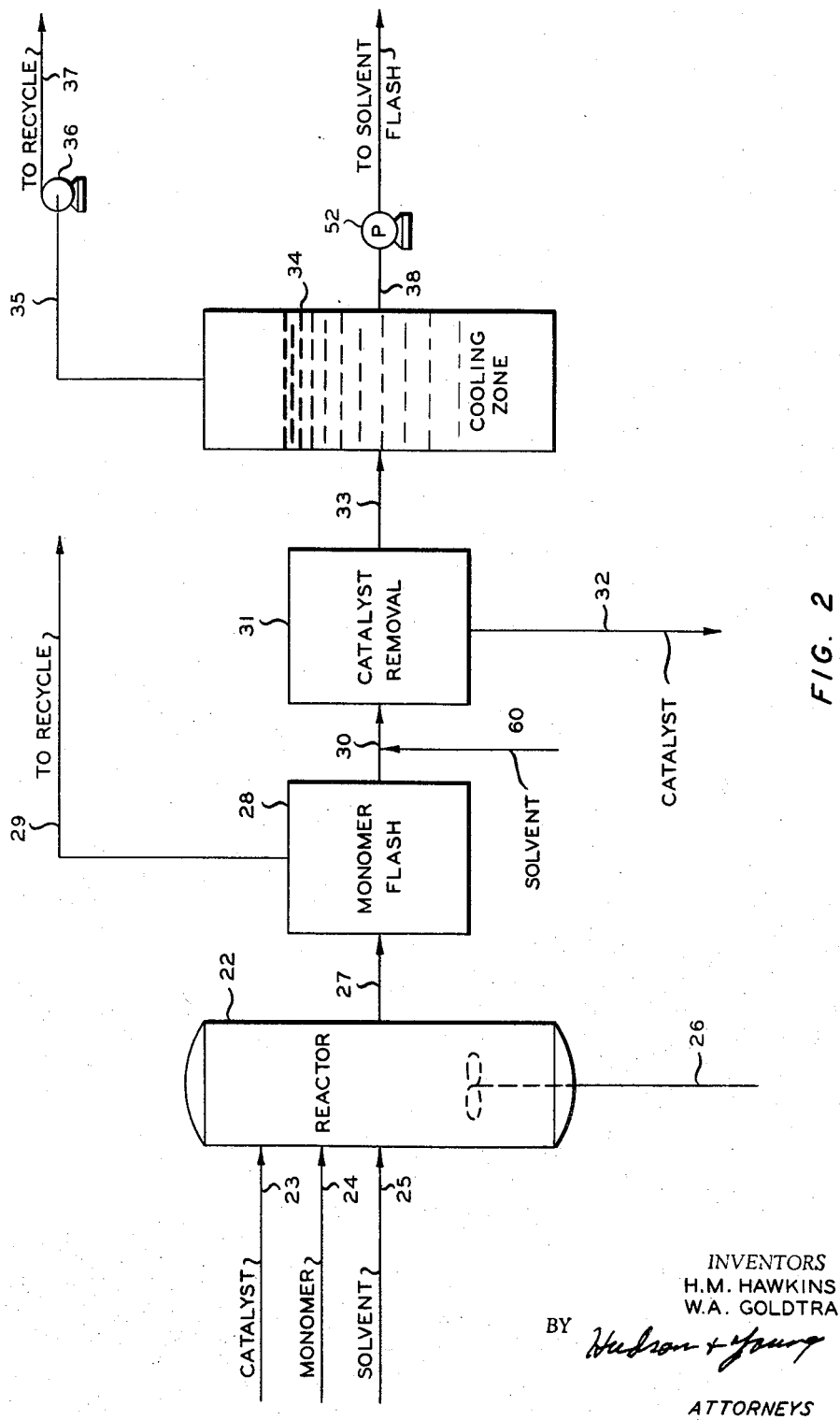

This invention will be further described by referring to the accompanying drawings which are:

Figure 1 is a schematic flow diagram of the method of this invention wherein the polymer is formed as discrete particles in the polymerization zone, and Figure 2 is a schematic flow diagram of an embodiment of this invention wherein the polymer is formed in solution and auto-cooling is employed to precipitate the polymer.

Referring now to the drawing, catalyst, monomer and diluent are fed to reactor 1 via conduits 2, 3 and 4 respectively wherein the monomer is polymerized as discrete polymer particles incorporating the catalyst. This reactor 1 is generally provided with some agitation means such as stirrer 5 and since the polymerization reaction is exothermic, the reactor is generally jacketed or contains cooling coils, not shown. The slurry of polymer in diluent as formed in reactor 1 passes via conduit 6, sequential pressure let-down valves 7 and conduit 8 to flash nozzle 9 in flash tank 10 wherein the pressure is sufficiently low to flash most of the diluent which passes overhead via conduit 11. This flash solvent will entrain a portion of the polymer. This flashed diluent containing some entrained polymer passes via conduit 11 to separator 12 wherein the polymer is removed and is returned via conduit 13 to the flash zone 10. Most of the polymer wet with diluent from nozzle 9 falls to fluidized polymer bed 14 in vessel 10 where it is maintained in fluidized state and is supported by grid 23 in the bottom of vessel 10. The diluent from separator 12 passes overhead via conduit 15 and a portion passed via conduit 46 to solvent recovery, not shown, and recycled to the reactor 1. The remaining portion of the diluent stream in conduit 15 is passed via conduit 47, blower 18, conduit 19, heat exchanger 20 and conduit 21 to nozzle 22. Conduit 53 is provided to add hot diluent as drying agent if desired which supplements or supplants recycled diluent. The diluent heated in exchanger 20 is sprayed into vessel 10 below grid 23 by means of nozzle 22. These heated diluent vapors pass upward through polymer bed 14 fluidizing same and further drying the polymer.

A portion of the fluidized polymer continuously falls into standpipe 16 and is removed therefrom by auger 17 driven by motor 54 to final dryer 48. A warm inert gas, such as nitrogen, $CO_2$, or even air, from conduit 49 continuously passes through dryer 48 sweeping out diluent vapors and is expelled via conduit 50 to solvent recovery unit, not shown. This dryer is equipped with a screw conveyor 56 driven by motor 55. The temperature of the inert gas can vary over a wide range up to the softening temperature of the polymer. Generally the temperature of this gas will be at least 100° F., however, by using large volumes, a temperature below the boiling point of the diluent can be used. Air can be employed, however, it is not ordinarily employed since it could form an explosive mixture with the diluent and also because of the possibility of oxidation of the polymer. The dry polymer is continuously removed via conduit 51 and passed to further processing as desired.

In the case of solution polymerization the modification of Figure 2 is useful. Catalyst, monomer and solvent are added to reactor 22 via conduits 23, 24 and 25 respectively. This reactor 22 is similar to reactor 1 containing a heat removing means, not shown, and a stirrer 26. This reactor operates at a higher temperature than does reactor 1, e.g., a temperature above the precipitation temperature of the polymer. The effluent polymer solution from reactor 22 passes via conduit 27 to vessel 28 wherein the pressure is lowered somewhat flashing unreacted monomer which is recycled to the reactor via conduit 29. The solution, free of monomer, then passes via conduit 30 to catalyst removal zone 31 wherein the catalyst solids are removed from solution by any suitable means such as a centrifuge or filtration. The catalyst is withdrawn via conduit 32. The solution then passes via conduit 33 to cooling zone 34 wherein the solution is cooled to below the precipitation temperature of the polymer by auto-refrigeration due to solvent evaporation and/or by indirect heat exchange. The solvent passes overhead via conduit 35 to compressor 36 and is recycled to the reactor via conduit 37. The resulting slurry in zone 34 is pumped via conduit 38 and pump 52 into flash zone 10. The treatment from this point on is the same as shown in Figure 1.

Specific embodiment

To further illustrate the operation of our invention, processes will be described for producing solid polyethylene both in the slurry process and in the solution process. The catalyst used in both processes is a microspherical catalyst consisting of 2.5 percent chromium as the oxide on a 90:10 silica:alumina support. This catalyst is activated at 950° F. in dry air for 4 hours.

In the process of Figure 1, pentane, ethylene and catalyst are fed to reactor 1 at a rate to provide a polymer slurry consisting of 25 weight percent polymer and 0.07 weight percent catalyst. This reactor operates at 210° F. and 500 p.s.i.a. The polymer so formed is in the form of discrete, nonagglutinative particles. The 25 percent polymer (containing catalyst) slurry passes through valves 7 to flash zone 10 wherein the pressure is 100 p.s.i.a. and the temperature is 200° F. Most of the solvent will flash at this pressure and temperature and the solids fall to fluidized bed 14 with the exception of a small amount of polymer which is entrained in the flashing solvent. The solvent vapors along with entrained polymer pass to separator 12 wherein polymer is removed and passed to the fluidized bed via conduit 13. The solvent vapors then pass overhead via conduit 15 and a portion sent to solvent recovery and recycled via conduit 46. A portion of the vapor is passed via conduit 47, blower 18, and conduit 19 to heat exchanger 20 wherein the vapors are heated to 220° F. and are passed to the bottom of the fluidized bed as a fluidizing and drying gas. The polymer is removed from zone 14 via standpipe 16 and auger 17. This auger 17 acts as a transfer means and pressure let-down means. The polymer passes to dryer 48 which operates at atmospheric pressure and has warm nitrogen (200° F.) sweeping therethrough. The dry polymer is removed via conduit 51.

In the case of solution polymerization the ethylene, catalyst and solvent, e.g., cyclohexane are passed to reactor 22 in proportion to provide an 8 percent polymer solution and 0.25 percent catalyst slurry. The reactor operates at 285° F. and 450 p.s.i.a. The polymer solution, about 8 percent polymer in cyclohexane, along with the catalyst passes to monomer flash zone 28 wherein the pressure is reduced to 100 p.s.i.a. thereby flashing monomer via conduit 29. The solution and catalyst along with additional solvent provided by means of conduit 60 in an amount to provide for a 4 percent polymer solution then pass to catalyst removal zone 31 wherein catalyst is recoved by filtration. This solution then passes to zone 34 wherein the temperature is lowered to 120° F. This cooling can be effected by auto-cooling, i.e., evaporation of solvent, by indirect heat exchange or by a combination of the two. The resulting slurry then passes via conduit 38 and pump 52 to flash zone 10 which operates at 170° F. and 10 p.s.i.a. In this embodiment wherein the polymer is formed in cyclohexane solution it is generally preferred to use a light hydrocarbon diluent as the vaporizing solvent in zone 10. This material is introduced via conduit 53 and is heated to 190° F. in zone 20. However, it is within the scope of this invention to recycle cyclohexane if desired. Where a second diluent is used, a separation zone will be employed in conduit 46 and the two solvents recycled in their respective streams.

In still another embodiment, the polymer is precipitated and recovered by filtration. The polymer, filter cake, is then introduced into zone 10 above the fluidized bed by means of an auger and an inert diluent such as pentane is introduced via conduit 53 as fluidizing and drying means. The flash zone in this case can operate at any desired pressure to obtain the most efficient drying, generally super-atmospheric.

This invention has been described in some of its preferred embodiments. Those skilled in the art will see many modifications which can be made while still obtaining the advantages of the invention.

We claim:

1. A method for recovering dry polymer of a 1-olefin of 2 to 8 carbon atoms from a slurry of polymer in a hydrocarbon diluent which comprises flashing diluent from polymer at an upper level in a flash zone, gravitating polymer to a fluidized bed of such polymer at a low level in said flash zone, heating additional said hydrocarbon diluent and introducing same in vapor state to said fluidized bed as the fluidizing medium and continuously withdrawing dry polymer from said bed.

2. A method for recovering dry polymer of a 1-olefin of 2 to 8 carbon atoms from a slurry of said polymer in a hydrocarbon diluent at relatively high pressure which comprises passing said slurry to an elevated position in a flash zone at reduced pressure thereby flashing said diluent, gravitating said polymer from said elevated position to a fluidized bed of such polymer at a relatively low position in said flash zone, withdrawing flashed diluent from said flash zone, heating a portion of said withdrawn diluent, passing the heated diluent as vapor to said fluidized bed of polymer as the fluidizing medium thereby further drying said polymer, withdrawing polymer from said fluidized bed and passing an inert gas over said withdrawn polymer.

3. The process of claim 2 wherein the 1-olefin polymer is prepared by polymerizing 1-olefins comprising at least 50 weight percent of a 1-olefin selected from the group consisting of ethylene and propylene.

4. A process for preparing 1-olefin polymer which comprises forming polymers of 1-olefins of 2 to 8 carbon atoms per molecule and having no branching nearer the double bond than the 4-position as a slurry in a hydrocarbon diluent at a relatively high pressure, passing said slurry to an elevated position in a zone of relatively low pressure thereby flashing said diluent, gravitating polymer from said elevated position to a fluid bed of polymer in the lower portion of said zone of relatively low pressure, withdrawing flashed diluent from said zone of relatively low pressure, heating a portion of said withdrawn flashed diluent to a temperature below the softening point of said polymer, passing this heated solvent in vapor phase to said fluidized bed as the fluidizing medium, withdrawing polymer from said fluidized bed associated with diluent vapor, and sweeping the last said diluent from polymer with an inert gas.

5. A process for preparing 1-olefin polymers which comprises polymerizing 1-olefin monomers of 2 to 8 carbon atoms per molecule and no branching nearer the double bond than the 4-position at a temperature below the solubility temperature of the polymer being formed and at an elevated pressure in the presence of a hydrocarbon diluent which is liquid at the operating pressure, passing the resulting slurry to a zone of relatively low pressure thereby flashing diluent from polymer, maintaining the polymer having solvent flashed therefrom in a fluidized bed, withdrawing flashed diluent from said zone of relatively low pressure, heating a portion of the withdrawn diluent, passing the heated diluent in vapor phase to said fluidized bed as the fluidizing medium, withdrawing polymer from said fluidized bed and sweeping diluent from withdrawn polymer with an inert gas.

6. The process of claim 5 wherein the 1-olefin comprises at least 90 weight percent ethylene.

7. The process of claim 6 wherein the polymerization is carried out in the presence of a chromium oxide catalyst and the diluent is selected from the group consisting of paraffins and cycloparaffins of 3 to 12 carbon atoms.

8. The process of claim 7 wherein the hydrocarbon diluent is a paraffin.

9. The process of claim 7 wherein the hydrocarbon diluent is normal pentane.

10. A process for preparing 1-olefin polymers which comprises polymerizing 1-olefin monomers of 2 to 8 carbon atoms per molecule and no branching nearer the double bond than the 4-position at a temperature above the solubility temperature of the polymer being formed and at an elevated pressure in the presence of a hydrocarbon solvent for said polymer and which is liquid under the polymerization pressure and temperature, cooling the resulting solution to a temperature below the precipitation temperature of said polymer so as to form a polymer slurry, passing the resulting slurry to a zone of relatively low pressure thereby flashing diluent from polymer, passing the polymer from said flashing to a bed of fluidized polymer, withdrawing flashed solvent from said flashing and heating a portion thereof to provide sufficient heat to maintain the desired temperature in the flashing zone, passing the thus heated solvent in vapor phase to said fluidized bed as fluidizing medium, passing a portion of said polymer from said fluidized bed to a relatively quiescent zone, withdrawing polymer associated with vaporous solvent from said quiescent zone via a pressure let-down means, and separating polymer from said vaporous solvent by means of an inert gas.

11. The process of claim 8 wherein the said 1-olefin monomers are polymerized in the presence of a chromium oxide catalyst and the hydrocarbon solvent is selected from the group consisting of paraffins and cycloparaffins of 3 to 12 carbon atoms per molecule.

12. The process of claim 11 wherein the hydrocarbon solvent is a cycloparaffin.

13. The process of claim 12 wherein the hydrocarbon solvent is cyclohexane.

14. The process of claim 13 wherein the 1-olefin monomers comprise at least 50 weight percent of a 1-olefin selected from the group consisting of ethylene and propylene.

15. The process of claim 13 wherein the 1-olefin monomers comprise at least 90 weight percent ethylene.

16. The process of claim 13 wherein the 1-olefin monomers comprise at least 90 weight percent propylene.

17. A method for recovering dry polymer of a 1-olefin of 2 to 8 carbon atoms from a slurry of polymer in a hydrocarbon diluent, which comprises flashing diluent from polymer in a flash zone, maintaining the polymer having diluent flashed therefrom in a fluidized bed, heating additional said hydrocarbon diluent and introducing same in vapor state to said fluidized bed as the fluidizing medium, and continuously withdrawing dry polymer from said bed.

18. A method for recovering dry polymer of a 1-olefin of 2 to 8 carbon atoms from a slurry of polymer in a liquid diluent which comprises flashing diluent from polymer in a flash zone, maintaining the polymer having diluent flashed therefrom in a fluidized bed, heating additional said liquid diluent and introducing same in vapor state to said fluidized bed as the fluidized medium, and continuously withdrawing dry polymer from said bed.

References Cited in the file of this patent

UNITED STATES PATENTS

| | | |
|---|---|---|
| 2,187,877 | Ferris et al. | Jan. 23, 1940 |
| 2,431,455 | Blanding | Nov. 25, 1947 |
| 2,537,130 | Green | Jan. 9, 1951 |
| 2,565,960 | Garber et al. | Aug. 28, 1951 |
| 2,626,856 | Alles | Jan. 27, 1953 |
| 2,635,684 | Joscelyne | Apr. 21, 1953 |
| 2,756,188 | Kaulakis | July 24, 1956 |
| 2,780,587 | Watkins | Feb. 5, 1957 |
| 2,858,902 | Cottle | Nov. 4, 1958 |